W. H. RICE.
SEPARATOR.
APPLICATION FILED FEB. 23, 1909.
946,518.
Patented Jan. 11, 1910.
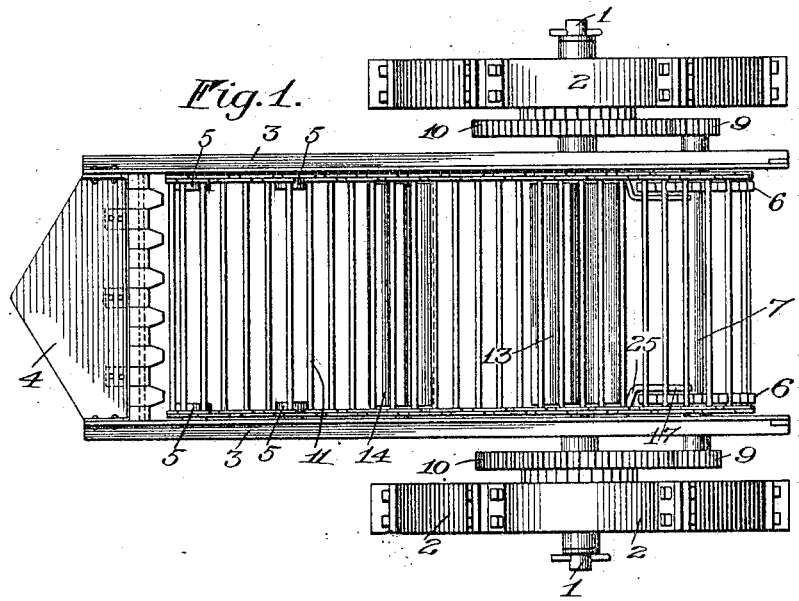
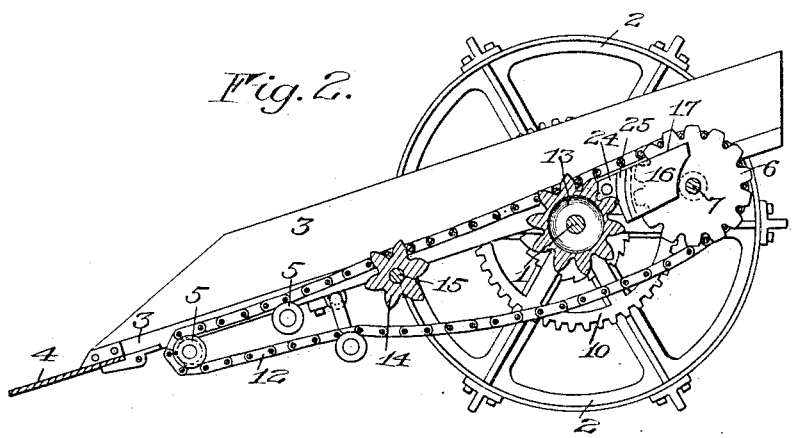

UNITED STATES PATENT OFFICE.

WILLIAM H. RICE, OF ROCHESTER, NEW YORK.

SEPARATOR.

946,518. Specification of Letters Patent. Patented Jan. 11, 1910.

Original application filed December 26, 1905, Serial No. 293,167. Divided and this application filed February 23, 1909. Serial No. 479,619.

*To all whom it may concern:*

Be it known that I, WILLIAM H. RICE, of Rochester, in the county of Monroe and State of New York, have invented certain new and useful Improvements in Separators; and I do hereby declare the following to be a full, clear, and exact description of the same, reference being had to the accompanying drawings, forming a part of this specification, and to the reference-numerals marked thereon.

The present invention relates to separators and particularly to that type in which there is employed a movable endless separating element having separating openings therein, this application being a division of an application filed by me on December 26, 1905, Serial No. 293,167 for improvements in potato diggers.

The invention has for an object to provide an agitator which will act upon material supported on the separator in such a manner that effective separation is obtained.

To these and other ends the invention consists in certain improvements and combinations of parts all as will be hereinafter more fully described, the novel features being pointed out in the claims at the end of the specification.

In the drawings: Figure 1 is a top view of a portion of a potato digger in which the invention is embodied, and Fig. 2 is a longitudinal section of the same machine.

Referring more particularly to the drawings 1 indicates an axle on the ends of which is journaled a pair of ground wheels 2. Between the wheels is arranged the frame of a machine preferably embodying side pieces 3 supported on the axle 1 and connected at their lower ends by an excavator or tool 4. Operating between the side pieces is the separating element which is in the form of an endless carrier preferably receiving material from the excavator or tool 4 and being guided in proximity to the rear ends of the latter by any suitable means, such as pulleys 5. This separating element is moved by any suitable means but it is preferred to employ sprocket wheels 6 arranged on a shaft 7 in the rear end of the axle, and driven by the ground wheels through the medium of pinions 9 and gears 10.

The separating element preferably comprises a plurality of transversely extending bars 11 connected at their outer ends by links 12, the bars being engaged by the sprocket wheels 6 in order to effect the driving of the separator. It will be noted that the bars provide between them transversely extending separating openings of uniform width through which the fine dirt or other material may be discharged.

In order to agitate the material on the separating element there may be provided an agitator in the form of a hollow drum or roller 13 rotatably mounted on the axle 1 and having longitudinally extending corrugations or projections adapted to pass through the slots or openings in the separating element and displace the material on the latter. This arrangement causes the material on all portions of the separating element to be engaged and at the same time the agitator is driven by the engagement of the walls of the slots or openings with the projections, thus insuring a positive drive and dispensing with extra driving means. Another agitator 14 of smaller diameter turns upon a rod 15 connecting the side pieces at a point nearer to the excavator than the agitator 13. It will be noted that the agitators also serve as supports for the separating element intermediate of the supporting pulleys 5 and the supporting and driving sprockets 6.

It is desirable to prevent stones, hard lumps or other material on the separating element entering between the latter and the driving sprockets and thus interfering with the action of the latter. To this end there may be employed for each sprocket a means which deflects the material on the belt away from the sprocket. In this instance a shield or guard has a portion 24 secured to a side 3, extended inwardly at 25 about a portion of the periphery of the sprocket and thence rearwardly at 16 over the inner face of said sprocket. The upper edge 17 of this shield lies in a plane substantially parallel with the proximate portion of the separating element so that material depending through the openings on the upper lap of the separator will be engaged first by the portion 25 and deflected inwardly away from the teeth of the sprocket.

When the invention is embodied in a potato digger, the material excavated by the tool 4 travels rearwardly onto the separating element and by the latter is carried rearwardly and upwardly, the finer dirt passing through the openings in the separating element before the agitators are reached. The latter then act upon the larger material causing it to be displaced from its position on the separating element and the dirt to be broken, the stones or hard lumps remaining on the separator being deflected away from the driving pulleys by the shields or guards. The larger material is discharged at the rear of the separator in any suitable manner.

A separator constructed in accordance with this invention is inexpensive to manufacture. It effectively separates small or fine material from larger material as all of the material on the separator is subjected to agitation. This agitation is produced in a simple manner without the employment of special driving mechanism for the agitator, and the driving sprockets are protected against the action of stones on the upper or the lower lap of the endless separating element.

I claim as my invention:

1. The combination with a separating element having separating openings therein and means for moving said element, of movably mounted projections operating through the openings from the under side thereof and arranged to act on all the material in the openings.

2. The combination with a separating element having separating openings therein and means for moving said element, of movably mounted projections operating through the openings from the under side thereof and arranged to act on all the material in the openings, said projections being engaged by the separating element to be moved thereby.

3. The combination with a separating element having separating openings therein and means for moving said element, of movably mounted projections substantially coextensive in width, of openings in the separating element and operating through said openings to displace the material therefrom.

4. The combination with an endless separating element having transversely extending separating openings therein and means for moving the separating element, of a rotatable agitator having longitudinally extending projections operating in said openings substantially throughout the entire lengths of said openings and engaged by walls of said openings to drive the rotatable agitator.

5. The combination with an endless separating element having transversely extending openings and means for moving the separating element, of a rotatable agitator extending substantially from one side of the separating element to the other and having projections operating through said openings.

6. The combination with an endless separating element having transversely extending separating openings, and means for moving the separating element, of a rotatable agitator having longitudinally extending projections operating in said transversely extending openings substantially throughout the entire lengths of said openings.

7. The combination with an axle having wheels thereon, of side pieces carried by the axle, an endless separating element arranged between the side pieces, means guiding the separating element in front of the axle, a driving shaft for the separating element arranged in rear of the axle, and an agitator rotatable on the axle.

8. The combination with an axle having wheels thereon, of side pieces carried by the axle, an endless separating element having openings therein and arranged between the side pieces, means guiding the separating element in front of the axle, a shaft carried in rear of the axle and having a pair of sprocket wheels thereon, and an agitator rotatable on the axle and having projections operating in the openings and engaged by the walls of the latter to drive the agitator.

9. The combination with an axle and the wheels thereon, of an endless separating element surrounding the axle, supports for the separator in front and in rear of the axle, and an intermediate support rotatable on said axle.

10. The combination with a conveyer embodying transversely extending bars, of a rotatable agitator having projections operating between the bars substantially throughout the lengths of the latter, and engaged by said bars to be driven thereby.

11. The combination with a separating surface having openings therein, of an agitator having projections operating in the openings substantially throughout the width of the separating surface.

12. The combination with an axle and wheels thereon, of an endless conveyer surrounding the axle, supports for the conveyer in front and in rear of the axle, an intermediate support for the conveyer supported by the axle.

WILLIAM H. RICE.

Witnesses:
RUSSELL B. GRIFFITH,
HAROLD H. SIMMS.